United States Patent
El-Sallabi et al.

(10) Patent No.: US 10,321,262 B2
(45) Date of Patent: Jun. 11, 2019

(54) GEO-SECURITY METHOD AND SYSTEM

(71) Applicant: QATAR FOUNDATION FOR EDUCATION, SCIENCE AND COMMUNITY DEVELOPMENT, Doha (QA)

(72) Inventors: Hassan Mohamed El-Sallabi, Doha (QA); Mohamed Mahmoud Abdallah, Doha (QA); Khalid Ali Qaraqe, Doha (QA); Jean-Francois Chamberland, Doha (QA); Gregory H. Huff, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 240 days.

(21) Appl. No.: 15/286,527

(22) Filed: Oct. 5, 2016

(65) Prior Publication Data
US 2017/0099576 A1 Apr. 6, 2017

Related U.S. Application Data

(60) Provisional application No. 62/237,461, filed on Oct. 5, 2015.

(51) Int. Cl.
| | | |
|---|---|---|
| *H04W 24/00* | (2009.01) | |
| *H04M 3/16* | (2006.01) | |
| *H04B 1/00* | (2006.01) | |
| *H04W 4/021* | (2018.01) | |
| *H04W 12/06* | (2009.01) | |
| *H04B 7/0456* | (2017.01) | |
| *H04W 12/10* | (2009.01) | |

(52) U.S. Cl.
CPC .......... *H04W 4/021* (2013.01); *H04B 7/0456* (2013.01); *H04W 12/06* (2013.01); *H04W 12/10* (2013.01)

(58) Field of Classification Search
CPC ....... H04W 4/00–4/043; H04W 4/185; H04W 8/08–8/18; H04W 40/06
See application file for complete search history.

(56) References Cited

U.S. PATENT DOCUMENTS

| | | | |
|---|---|---|---|
| 6,989,751 B2 | 1/2006 | Richards | |
| 7,791,455 B1 | 9/2010 | MacLean, III et al. | |
| 8,315,389 B2 | 11/2012 | Qiu et al. | |
| 8,384,538 B2 | 2/2013 | Breed | |
| 8,711,218 B2 | 4/2014 | Zehavi | |
| 2014/0022128 A1* | 1/2014 | Smith | G01S 5/0273 342/465 |
| 2014/0369435 A1* | 12/2014 | Kneckt | H04B 7/0413 375/267 |
| 2015/0135293 A1* | 5/2015 | Mookiah | H04W 12/12 726/7 |
| 2015/0257167 A1* | 9/2015 | Chen | H04W 4/70 370/330 |

* cited by examiner

Primary Examiner — San Htun
(74) Attorney, Agent, or Firm — Richard C. Litman

(57) ABSTRACT

The geo-security method and system uses spatio-temporal radio channel information during authentication to grant permission to access, use and/or operate the intended device. The geo-security method and system uses a wideband radio channel impulse response (or transfer function of radio channel) from antenna of RF source to antenna of a RF receiver at the device position to determine the legitimacy of the intended device's location.

12 Claims, 3 Drawing Sheets

GEO-SECURITY METHOD AND SYSTEM

CROSS-REFERENCE TO RELATED APPLICATION

This application claims the benefit of U.S. Provisional Patent Application Ser. No. 62/237,461, filed Oct. 5, 2015.

BACKGROUND OF THE INVENTION

1. Field of the Invention

The present invention relates to authenticated access, and particularly to a geo-security method and system that provides authenticated access to highly important devices by radio frequency signals where the devices must be operated only at specified locations.

2. Description of the Related Art

Conventional security techniques are usually based on something that is available to authorized users, such as something the users know, like passwords, or that the users have, like magnetic cards, or something particular with a user, such as biometrics. However, there are applications where security has to be enhanced and has to be related to the location where devices are to be operated. In such applications, geo-security has to be used.

Thus, a geo-security method and system solving the aforementioned problems is desired.

SUMMARY OF THE INVENTION

The geo-security method and system uses spatio-temporal radio channel information during cryptographic authentication to grant permission to access, use and/or operate the intended device. The geo-security method and system uses a wideband radio channel impulse response (or transfer function of the radio channel) from the antenna of a RF source to the antenna of a RF receiver at the intended device position to determine the legitimacy of the intended device's location. Cryptographic authentication using the present method includes the step of precoding a transmitted signal at the security system transmitter with the time-reversed wideband channel impulse response of the device between the transmit antenna of an RF source and the receiver antenna of the RF receiver of the device at a particular position. During commissioning stage, the security system transmitter sends a particular sequence to the receiver of the device, which is used to estimate the wideband radio channel coefficients. The channel coefficients are sent back to the transmitter side to precode its matched filter setting at the system transmitter to the time reversal of the measured wideband radio channel. During normal operation, if the device is in the correct position, then the convolution of the radio channel impulse response with the precoding filter at the transmitter will focus transmit energy of the receiver antenna of the device and scatter transmit energy at other locations. If the receiver at the device detects an energy level that is higher than a pre-set threshold, then the security system generates successful authentication and operation of the device can occur.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The geo-security method and system uses spatio-temporal radio channel information during cryptographic authentication to grant permission to access, use, and/or operate the intended device. The geo-security method and system uses a wideband radio channel impulse response or a transfer function of the radio channel from the antenna of a RF source to the antenna of a RF receiver at the device position to determine the legitimacy of the intended device's location. The wideband radio channel impulse responses of a fixed transmitter antenna location to different positions are characterized by multipath radio wave rays that reach the receiver antenna position. The multipath profile structure and its characteristics are defined by the distribution of surrounding scatterers in the propagation environment and antenna characteristics at both ends. This feature makes the receiver positions have different multipath profile structure and characteristics for same indoor environment. These unique characteristics are mapped in spatio-temporal information of the wideband radio channel between the transmitter and receiver antennas. This position-dependent unique spatio-temporal information is used in a certain way in cryptographic authentication for legitimacy of the device being in its intended position. The spatio-temporal information can be in the time domain as a wideband radio channel impulse response or in the frequency domain as a radio channel transfer function. The information can be obtained from measurements performed at the receiver side during a training stage.

Figure 1:
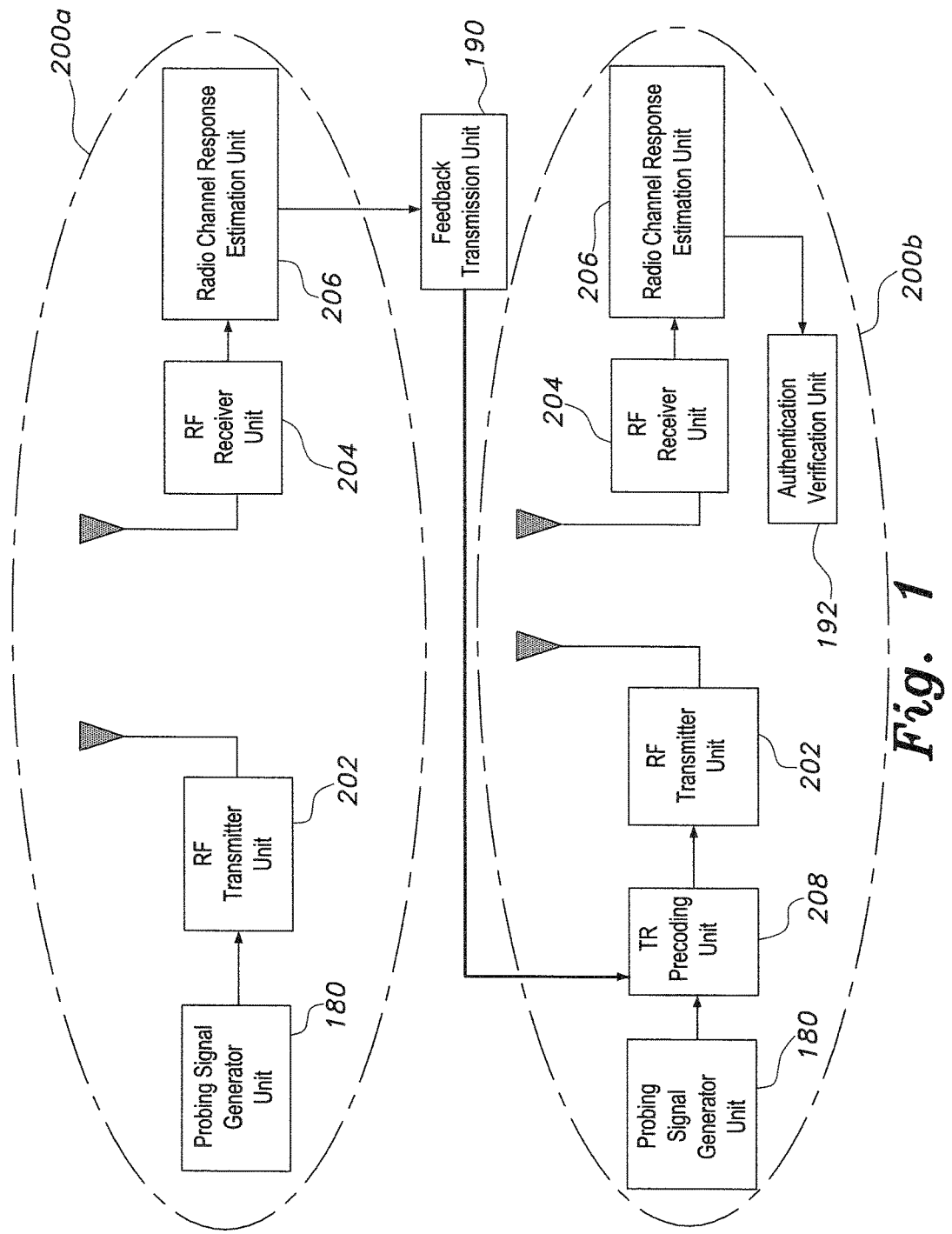
FIG. 1 is a block diagram showing the operational modes of the geo-security method according to the present invention.

As shown in FIG. 1, the geo-security system operates in modes (or stages) comprising a first mode 200a and a second mode 200b. Using probing signal generator unit 180 connected to RF transmitter unit 202, and RF receiver unit 204 connected to radio channel response estimation unit 206, the first mode 200a extracts spatio-temporal radio channel impulse response for use as geo-security authentication keys. During the process of extraction of the spatio-temporal authentication keys, the transmitter 202 sends a particular wideband probing sequence known to the receiver 204, which is used to estimate the wideband radio channel. The wideband radio channel impulse response (or radio channel transfer function) between transmit antenna and receiver antenna can be estimated by either of two methods. The first method includes estimating the radio channel at the antenna of the authenticated device from wideband probing signals transmitted by an antenna at the authentication source. Then, the estimated channels are sent back to the authentication device (i.e., source) via feedback transmission unit 190 using different possible means, such as WIFI, fiber optic, Ethernet, and the like. In the second method, no feedback unit is required, but the device to be authenticated has RF transmitter unit 202 send wideband probing signals to the authentication device, which estimates the wideband radio channel at the antenna for the authentication device from antenna of device to be authenticated. Assuming that the radio channel is reciprocal, this estimated wideband radio channel impulse response can be used in precoding (via TR precoding unit 208) the transmitted signal from authentication device (i.e., source) to authenticated device.

Feedback transmission unit 190 interconnects first mode 200a and second mode 200b. It is needed during the commissioning stage during which the spatio-temporal radio channel information used in cryptographic authentication is extracted. The second mode 200b, which normal operation mode, includes the probing signal generator unit 180, this time connected to a time/reversal (TR) precoding unit 208, which has an output connected to RF transmitter unit 202. In this second mode 200b, RF receiver unit 204 is still connected to radio channel response estimation unit 206, which now has an output connected to authentication verification unit 192. This second mode 200b is used in a specific way to precode the transmitted probing signal using the spatio-temporal radio channel impulse response extracted in the first mode 200a. The first mode 200a is needed during the operation of the extraction of spatio-temporal authentication keys that correspond to the position of transmit and receive antennas, their characteristics and distribution of surrounding scatterers. Once the authentications are extracted and sent back to the transmitter, the first mode 200a and the feedback transmission unit 190 may not be needed. However, they can be used for updating the spatio-temporal keys if there are changes in the distribution of scatterers in the RF propagation environment. In order for this mode to work properly, the spatio-temporal authentication keys represented in wideband channel response between transmitter antenna and receiver antenna of the device to be authenticated must be known to the transmitter and while the channel is stationary during the transmission period. If the authenticated device is at its intended position, then the radio channel impulse response will be highly correlated with the precoding stage, and the auto-correlation result will indicate a success flag of the authentication process. If the device has been moved to another location where the scatterers are different or their relative positions are different, then the channel impulse response is different from that in the precoding filter in the transmit side. Then, the cross-correlation process will indicate a failed authentication process.

The second operating mode 200b is based on exploiting this radio channel feature in authenticating access to devices that are in their intended locations. The geo-security system is based on precoding a transmitted signal at transmitter 208 with a time-reversed version of the wideband channel impulse response (i.e., complex conjugate of radio transfer function) between transmit antenna of RF source and receive antenna of a RF receiver 204 in the device at a particular position. The wide radio channel impulse responses (or radio channel response) of a fixed transmitter location to different positions are characterized by multipath radio waves that reach the receiver positions. The multipath profile structure and its characteristics are defined by the surrounding scatterers in the propagation environment. This feature causes the receiver locations to have different footprint signatures defined by a detailed multipath profile and its characteristics for the same indoor environment. Scatterers are different for indoor/outdoor environments.

The first mode 200a can be implemented in different ways, either in the time domain or the frequency domain. For a time domain system, as shown in FIG. 1, the transmitter 202 sends a known wideband signal to the receiver 204 via a radio channel. The radio channel characteristics are defined by the location of transmitter antenna 202, the location of receiver antenna 204, and the location of scatterers in RF propagation environment, in addition to antenna characteristics in terms of their radiation patterns. There could be different ways on how the channel can be probed, which include, for example: (1) a pseudonoise (PN) sequence correlation approach; and (2) a swept time-delay cross-correlation approach.

Figure 2:
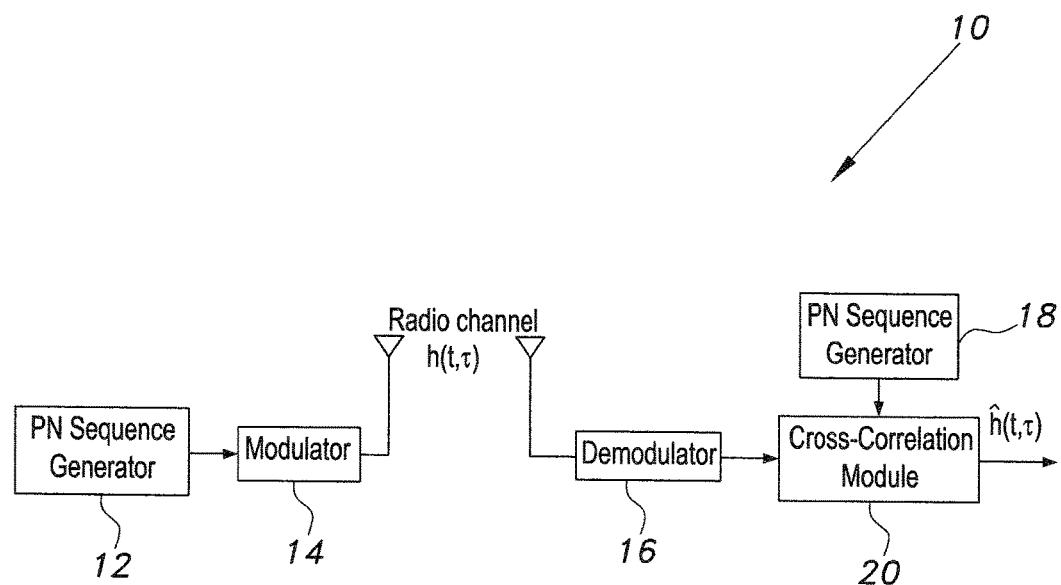
FIG. 2 is a block diagram showing channel impulse response estimation.

These are based on correlation/pulse-compression techniques and on the assumption that the channel is mostly stationary (quasi-static) during the measurement period. In this definition, the usual rule of thumb is that the channel can be viewed as time-invariant if the probing period is much smaller than the reciprocal of the maximum Doppler shift, which is generally the case in indoor scenarios and most of outdoor propagation environments. If x(t) is a short pulse probing sequence from a source at location $r_1$, the electromagnetic wave propagates in the scattering medium via different paths of different delays and angle of arrivals and phases and arrives into the receive antenna located at $r_2$. These arrived multipath signals represent unique characteristics of the channel between two antennas located at positions $r_1$ and $r_2$. The resolution of the differentiation of locations is a function of the bandwidth of the transmitted signal and the system. The transmitted signal in time domain-based systems could use PN sequences as the probing sequence, which requires less peak power than the pulse-based system. Additionally, the PN sequence-based approach involves optimal waveforms with maximum spectral efficiency. The receiver could be based on a sliding correlator principle, a stepping correlator, or by direct sampling of the received signal. Adopting the rapid sampling approach depends on the bus between sampling unit and mass memory. The system 10, as shown in FIG. 2, includes a pseudo-noise (PN) sequence generator 12 connected to a modulator 14 at the transmission authentication site. A radio channel $h(t,\tau)$ is opened to the authenticating receiver, where it is demodulated by demodulator 16 and fed to a cross-correlation module 20 that cross-correlates the signal output from the demodulator 16 with a second synchronized PN sequence generator 18 at the receiving site for preparation of a feedback signal that is based on a time domain transmission formed by the PN sequence generator 12 and the modulator 14 that probes the radio channel $h(t,\tau)$. The output of the cross-correlation module 20 provides a complex cross-correlated signal $\hat{h}(t,\tau)$, which is used as a channel impulse response estimation for the geo-location cryptographic authentication process.

The system 10 in FIG. 2 shows a principle of one way of time domain transmitter that probes the radio channel. The PN generator includes feedback shift registers that can generate a sequence of m-sequences of length L. The pulse width of each pulse in the PN sequence is determined by chip frequency generated by phase-locked loop (PLL). The PSK modulator 14 can be a double-balanced microwave mixer.

In the receiver side, the electromagnetic signal received by antenna at intended location is filtered and amplified by a low-noise preamplifier and down-converted to IF range, which include automatic gain control (AGC) with computer-controlled attenuators of high dynamic range and major part of the signal amplification.

A PN sequence has a particularly important feature, which is its periodic autocorrelation. The autocorrelation of a PN m-sequence has a single, very sharp peak at the zero shift point. This property allows detection of each multipath component as the received signal is correlated with the transmitted PN probing sequence. Convolution matched-filtering is a commonly used technique to perform correlation of a received signal with an originally transmitted PN probing sequence. Other techniques are also available and known in literature. The performance of this kind of channel-probing transmitter is evaluated on the basis of autocorrelation properties, which is defined for a periodic signal s(t) with period $T_s$ as:

$$R_s(\tau) = \frac{1}{T_s} \int_0^{T_s} s(t) s^*(t-\tau) \, dt. \tag{1}$$

The PN sequence at the receiver side is upconverted to the intermediate frequency (IF) range and correlated with the received signal. The output of the matched filter is composed of M multipath components, each having its own amplitude, delay and phase resulting from interaction with scatterers in the propagation environment, $$r(t) = \sum_{n=1}^{M} a_n e^{j\theta_n} R_s(t-\tau_n). \tag{2}$$

Each multipath component is an identified delayed version of the auto-correlation function $R_s$. The width of $R_s$ determines the minimum resolvable delayed component, which is related to twice the chip period of the PN sequence. The amplitude of each multipath component is determined by interaction propagation mechanism and antenna properties at the transmitter and receiver sides. If the receiver is based on a DSP configuration, the IF signal is converted in a direct-quadrature (IQ) demodulator to become a baseband signal, which is sampled with a high sampling rate. The data sampling process is achieved during intervals that last longer than the sequence length. A matched filter can be used as a detector. The dynamic range of the impulse response is obtained from the auto-correlation properties of the m-sequence of length L giving $20 \log_{10}(L)$. However, this dynamic range is not achievable in practice, due to some system non-ideality. Since the transmitter and receiver systems have their own contributions in received signal in addition to the multipath propagation environment, the results have to be calibrated by considering $h_{sys}$, which is the impulse response of the system. The measured impulse response can be defined as:

$$R_{ss'}(t,\tau) = h(t,\tau) \otimes h_{sys}(\tau) \otimes R_s(\tau). \tag{3}$$

Careful calibration of the system impulse response and processing measurement data leads to impulse response estimation as:

$$\hat{h}(t,\tau) = R_{ss'}(t,\tau). \tag{4}$$

The estimated impulse response contains the spatio-temporal information of particular positions of transmitter and receiver antennas with particular relative distributions of scatterers. This information is inherent in parameters of multipath rays in terms of delay and directions of departure and arrivals in azimuth and elevation planes, which affect the rays' amplitudes and phases. If the receiver antenna, which is supposed to be part of the authenticated device is moved from that particular position, then the information in delay and direction domains will vary, which is reflected in the rays' amplitudes and phases. So, the extracted $\hat{h}(t,\tau)$ is considered here as spatio-temporal authentication keys in terms of either a wideband radio impulse response or a radio channel transfer function and authentication process.

With respect to the second operating mode 200b, the main idea in using spatio-temporal radio channel response in geo-security is based on a time-reversal property that allows, if some conditions are met, to focus energy in space and time on the point of interest if the transmitted signal is filtered through the complex conjugate and time-inverted channel impulse response. It offers fine focusing resolution that allows discrimination of receivers positioned in one position from the other. This system is based on spatio-temporal authentication keys that represent wideband channel response between transmitter antenna of authentication device and receiver antenna of device to be authenticated must be known to the transmitter side and channel is stationary during the transmission period. After extraction process of the authentication keys in terms of wideband impulse response, they are used in transmitter side in pre-coding filter stage 208 using time reversal (TR) approach. The precoding stage authenticates the transmitted signal with spatio-temporal information of radio channel of where the authenticated device must be.

The authentication technique works by pre-filtering the transmitted signal with a filter whose impulse response is the complex-conjugate and time reversal of version of the estimated wideband channel impulse response of authenticated device in intended position. This is the main idea of this method in geo-authentication, since the composite impulse response of the two blocks, the precoding filter and radio channel response, will exhibit a concentration of multipath energy if the impulse response of the precoding filter is the complex-conjugate and time reversal of the impulse response of the channel (or complex conjugate of channel transfer function). If it is not so, the multipath energy will be spread out in delay domain and no energy spatial focusing takes place.

The precoding at transmitter side is a matched filter to the complex conjugate and time reversal of the measured wideband radio channel. So, if the device is in its right position, then the convolution of the radio channel impulse response with impulse response of the precoding filter at transmitter (i.e., works as a unique geotag) will focus transmit energy at receive antenna of the device and scatter transmit energy at other locations. So, if the receiver at the authenticated device detects an energy level that is higher than a pre-set threshold or fulfilling different measures of authentication success, then, the geo-security system generates successful authentication and operation of the device can operate.

For a radio channel of a source antenna of authentication device located at $r_1$, the electromagnetic wave propagates in the scattering medium and arrives to the receive antenna located at $r_2$ via different paths of different delays and angle of arrivals and phases. These arrived multipath signals represent unique characteristics of the channel between two antennas located at positions $r_1$ and $r_2$. The resolution of the differentiation of locations is a function of bandwidth of the transmitted signal and the system. This wideband impulse response is denoted as $\hat{h}(t,\tau,r_1 \rightarrow r_2)$, where t is the measured time and $\tau$ denotes delay of multipath components of the measured channel impulse response. In the authentication process, the transmitter filters transmitted probing sequence by a filter $g_m$ as authentication source whose impulse response is the complex conjugate and time reversal of radio channel extracted in first mode and considered as authentication keys and is given as:

$$g_m(t;\tau) = k\hat{h}^*(t,\tau,r_1 \rightarrow r_2), \tag{5}$$

where k is a power normalization factor and * denotes the complex conjugate. The received signal at the antenna of the authenticated device can be written as:

$$y(t) = h(t,\tau,r_1 \rightarrow r_2) \otimes g_m(t;\tau) \otimes x(t) + n(t), \tag{6}$$

where ⊗ denotes convolution operation, x(t) is probing signal and n(t) is the receiver noise. The authenticated device is considered to be located at a specific position and stationary and the channel is considered static or quasi-static if there is some slow traffic around. Then, the equivalent impulse response for authentication source antenna at $r_1$ to a receiver at $r_2$ can be written as:

$$h_{eq}(t, \tau, r_1 \to r_2) = h(t, \tau, r_1 \to r_2) \otimes g_m(t; \tau) \quad (7)$$
$$= h(t, \tau, r_1 \to r_2) \otimes \hat{h}^*(t, -\tau, r_1 \to r_2),$$

which technically is the autocorrelation function of $h(t,\tau, r_1 \to r_2)$ that results from convolution operation. Thus, if the authenticated device is at its intended location, then the result of $h_{eq}(t,\tau,r_1 \to r_2)$ shows compressed energy at the center of the equivalent impulse response, $h_{eq}(t,\tau,r_1 \to r_2)$, and very low power level elsewhere. In frequency domain, the equivalent transfer function of the system with authentication precoding filter can be written as:

$$H_{eq}(t; f, r_1 \to r_2) = H(t; f, r_1 \to r_2) \otimes \hat{H}^*(t, f, r_1 \to r_2) \quad (8)$$
$$= |H(t; f, r_1 \to r_2)|^2.$$

The authentication process and its verification can further be enhanced by using multiple antennas at the authentication device side, as each antenna element sees different wideband radio impulse response to the antenna at the authenticated device. For N transmit antennas, the equivalent impulse response at antenna of authenticated device is at position $r_p$ from transmit antenna i at $r_i$ can be written as:

$$h_{eq}^{MISO}(t; \tau, T \to R) = \sum_{i=1}^{N} h(t, \tau, r_i \to r_p) \otimes \hat{h}^*(t, -\tau, r_i \to r_p). \quad (9)$$

Figure 3:
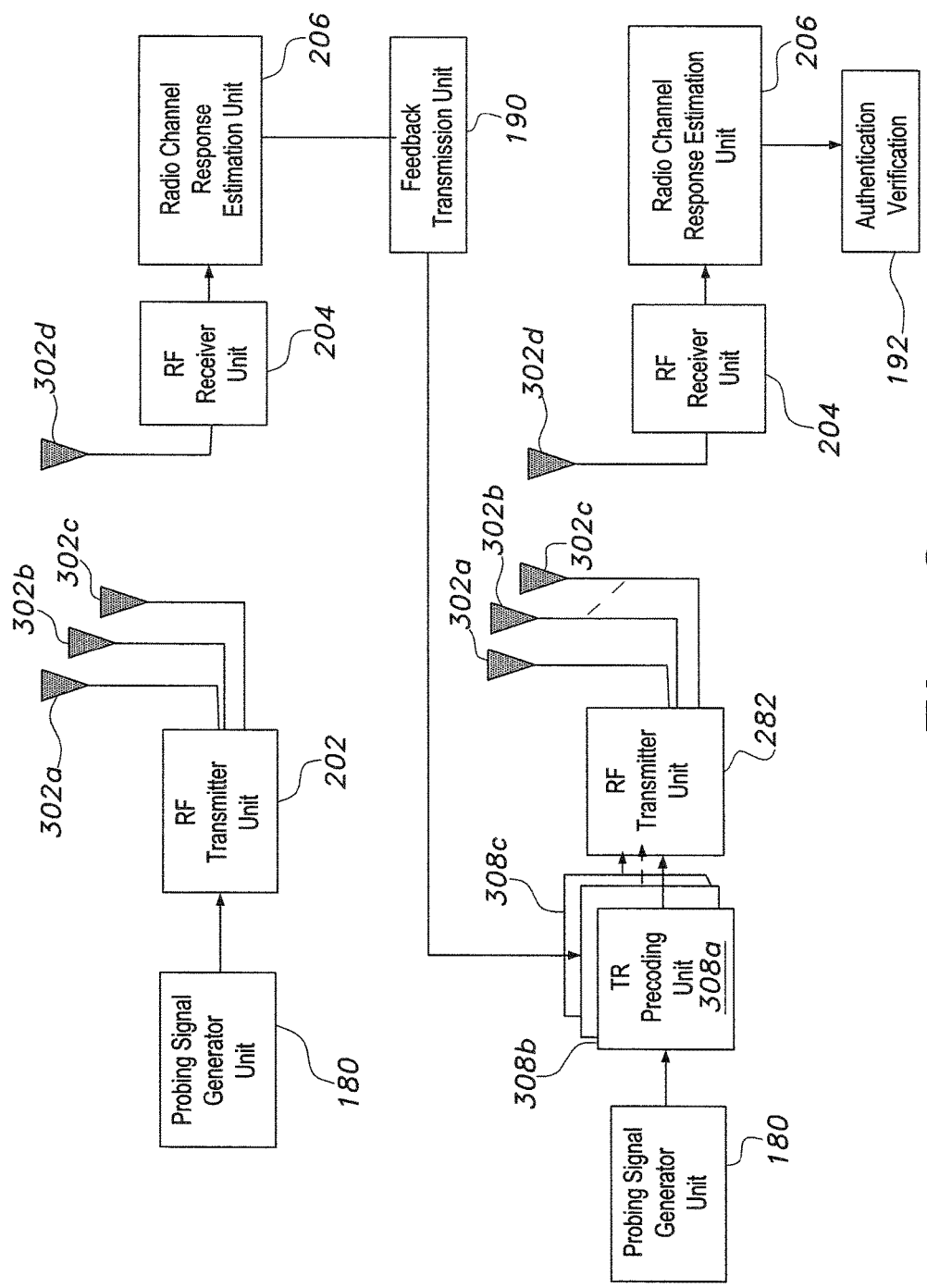
FIG. 3 is a block diagram showing an exemplary geo-security system according to the present invention utilizing multiple antennas at the transmit side.

The peaks of signals at receiver side of the authenticated device are aligned and multiple antennas achieve array gain as a result of coherent addition of signals as difference from that of single antenna system achievement. For Multiple Input Single Output (MISO) antenna authentication system, the above measures for authentication verification can be used with $h_{eq}^{MISO}$ instead of $h_{eq}$. The received signal in MISO authentication system can be written as $$y_p(t) = \quad (10)$$
$$x(t) \otimes \sum_{i=1}^{N} h_{eq}^{ip}(t; \tau, r_i \to r_p) + \sum_{i=1}^{N} \sum_{k \ne p}^{N} x(t) \otimes h_{eq}^{ikp}(t; \tau, r_i \to r_p) + n_p(t),$$

where the first term in the right hand side of the above equation (10) is the boosted authentication result from many antennas if the authenticated device is at its intended position, and the second part is the interfering signal that results from different cross-correlation of different impulse responses seen by different antennas. The antenna spacing has to be designed to minimize the interference signal that results from similarity in radio channel impulse responses. This interference has to be minimized so that power of signal of authenticated device at its intended position is not reduced. In the MISO authentication system shown in FIG. 3, RF transmitter unit 202 is connected to multiple antennas 302a, 302b, and 302c. The RF receiver unit 204 has a single antenna 302d. Due to the multiple antenna transmission from antennas 302a, 302b, and 302c, the second operating mode 200b includes corresponding multiple time reversal (TR) precoding units 308a, 308b, and 308c.

Furthermore, the system can be used to authenticate access to more than one equipment in the same propagation environment under the condition that their receiver systems can detect the transmitted authentication signals. The multi-authentication can be realized by different ways utilizing the same concept described above. One way may require more than one precoding filter. Each filter has an impulse response that is characterized by the complex conjugate and time reversal of wideband impulse response of radio channel between antenna of authentication device to antenna of receiver at every authenticated device. If we have M devices to be authenticated, the system needs to authenticate transmit signal for every device with its own spatio-temporal information characterized by its position.

The geo-security performance can further be enhanced by using reconfigurable antenna in which particular radiation pattern can be created to increase security and enhance system performance. The reconfigurability procedure generates switching patterns that can be considered as part of geo-security authentication process. The received signal $r^i(t)$ impacted with reconfigurable antenna state i can be written as:

$$r^i(t) = \sum_{n=1}^{M} a_n f^i(\theta_n, \Phi_n) e^{j\theta_n} R_s(t - \tau_n). \quad (11)$$

where $f^i(\theta_n, \Phi_n)$ is radiation pattern of state i, the reconfigurable antenna is based on multi-state radiation patterns, where each radiation pattern state is identified by particular combinations of ON-OFF switches on the antenna control circuitry. These combinations of ON-OFF switches are considered as additional level of security in antenna level in addition to geo-security level. The impact of the antenna in security and environment scatterers are both included in authentication process, as they are inherently part of the wideband impulse response of the channel used in the precoding filter.

Regarding measure of the authentication process, if the impulse response of the authentication precoding filter matches the complex conjugate and time reversal of the radio channel impulse response, then energy is focused at the antenna of the authentication device to indicate that it is at its intended position. Hence, the success or failure of spatial energy focusing can be considered by a measure of authentication verification process or not. This requires a measure of spatial energy focusing and/or temporal compression.

The focusing of spatial energy at the antenna of the authenticated device at a particular time $\tau_0$ for intended position of the device $R_0$ or any other position R, for a transmit antenna located at position T is characterized by the relation:

$$\kappa_0(d) = \lim_{|R - R_0| \to \infty} \frac{|h_{eq}(t; \tau_0, T \to R_0)|^2}{|h_{eq}(t; \tau_0, T \to R)|^2}, \quad (12)$$

with $\tau_0$ such that $$|h_{eq}(t; \tau_0, T \to R)| = \max_{\tau}(|h_{eq}(t; \tau, T \to R_0)|),$$

i.e., is the delay of the peak of the equivalent channel impulse response at the antenna if the authentication device is at its intended position. It should be noted that $|h_{eq}(t;\tau_0, T \to R_0)|$ is available to authenticated device as a result from calibration process, i.e., first mode. It is obtained during calibration stage at end of first mode of operation after extraction of spatial-temporal authentication keys. The term $h_{eq}(t;\tau_0,T \to R)$ is what is measured during the second mode of operation (i.e., normal operation scenario) to verify whether the device is at its intended position (i.e., $R_0$) or not (i.e., R). If the device is at its normal operation mode and at its proper position, then, $\kappa_0(d)$ will be close to unity, then, authentication success flag is ON. If not, the term $h_{eq}(t;\tau_0, T \to R)$ will have small value that leads to high value of $\kappa_0(d)$, which violates authentication success, which makes its flag to be set to OFF.

Other measure is to consider peak energy independently from the time delay, which can be written as:

$$\kappa_{max}(d) = \lim_{|R-R_0| \to \infty} \frac{\max_{\tau}|h_{eq}(t; \tau, T \to R_0)|^2}{\max_{\tau}|h_{eq}(t; \tau, T \to R)|^2}. \tag{13}$$

It is the ratio between the energy at $R_0$ to the energy at distance R. It should be noted that $|h_{eq}(t;\tau,T \to R_0)|$ is available to the authenticated device. It is obtained during calibration stage at end of first mode of operation after extraction of spatial-temporal authentication keys. The term $|h_{eq}(t;\tau,T \to R)|$ is what is measured during second mode of operation to verify whether the device is at its intended position (i.e., $R_0$) or not (i.e., R). If the device is at normal operation mode at its proper position, then, $\kappa_{max}(d)$ will be close to unity, then, authentication success flag is set to ON. If not, the term $|h_{eq}(t;\tau,T \to R)|$ will have small value that leads to high value of $\kappa_{max}(d)$, which violates authentication success, which makes its flag is set to be OFF.

Both $\kappa_0(d)$ and $\kappa_{max}(d)$ indicate that the larger the value of each ratio, the better authentication and more spatio-temporal information are considered in impulse response authentication.

In order to allow for some local movements of the authenticated device, the geographical authentication radius should be increased. This can be accomplished with 3-dB contour be used of the energy function of $|h_{eq}(t;\tau_0,T \to R)|^2$ or $|h_{eq}(t;\tau,T \to R)|^2$. The contour is described by the distance in which the energy R remains within 3 dB from the energy at $R_0$, i.e., $$(10\log_{10}(|h_{eq}(t; \tau_0, T \to R)|^2) - 10\log_{10}(|h_{eq}(t; \tau_0, T \to R_0)|^2)) < 3 \tag{14}$$

and/or $$\left(10\log_{10}\left(\max_{\tau}|h_{eq}(t; \tau, T \to R_0)|^2\right) - 10\log_{10}\left(\max_{\tau}|h_{eq}(t; \tau, T \to R)|^2\right)\right) < 3. \tag{15}$$

The other metric that can be used for authentication verification is the time delay focusing of the energy at the antenna of authenticated device at its intended position or other locations. This is a measure of temporal compression due to authentication process. The time delay focusing can be described by the RMS delay spread of $|h_{eq}(t;\tau,T \to R_0)|^2$ and $|h_{eq}(t;\tau_0,T \to R)|^2$ as follows:

$$\Delta\tau(R_0) = \sqrt{\frac{\int (\tau - \tau_m)^2 |h_{eq}(t; \tau_0, T \to R_0)|^2 d\tau}{\int |h_{eq}(t; \tau_0, T \to R_0)|^2 d\tau}} \tag{16}$$

and $$\tau_m(R_0) = \sqrt{\frac{\int \tau |h_{eq}(t; \tau_0, T \to R_0)|^2 d\tau}{\int |h_{eq}(t; \tau_0, T \to R_0)|^2 d\tau}} \tag{17}$$

and $$\Delta\tau(R) = \sqrt{\frac{\int (\tau - \tau_m)^2 |h_{eq}(t; \tau, T \to R)|^2 d\tau}{\int |h_{eq}(t; \tau, T \to R)|^2 d\tau}}. \tag{18}$$

and $$\tau_m(R) = \sqrt{\frac{\int \tau |h_{eq}(t; \tau, T \to R)|^2 d\tau}{\int |h_{eq}(t; \tau, T \to R)|^2 d\tau}}. \tag{19}$$

The time delay compression metric is defined as the relative increase in RMS delay spread $\Delta\tau(R)$ at any point R compared to that at $R_0$. The parameter is denoted as:

$$\sigma(R) = \frac{\Delta\tau(R) - \Delta\tau(R_0)}{\Delta\tau(R_0)}. \tag{20}$$

The larger the value indicates better temporal focusing in the sense that the time delay compression at the position where the device is intended to be with respect to any position away from its intended point. If the authenticated device is at its proper position of operation, then $\Delta\tau(R) \approx \Delta\tau(R_0)$ and $\sigma(R)$ will be very small, which indicates the authentication process is successful and its flag is set to ON. If the device is moved to other location, the energy is spread in delay domain and this spread is measured with RMS delay spread $\Delta(R)$ to lead to a high value of $\sigma(R)$, which indicates that authentication verification is failed and its flag is set to OFF.

Another metric to verify authentication process via measuring temporal focusing is the peak to side lobe ratio. It is defined as the ratio of the energy in the main peak to that in the rest of the impulse response, which can be defined as:

$$\eta = 20\log_{10}\left(\frac{|h_{eq}(t; \tau_0, T \to R)|}{\max_{\tau}|h_{eq}(t; \tau, T \to R)|}\right). \tag{21}$$

The authentication process yields a high value of $\eta$ if the authenticated device is in its intended position and the system has to be designed to maximize peak-to-side lobe ratio ($\eta$). If the device is moved from its intended position, the measure $\eta$ will be of small value and authentication verification is failed. In case of MISO system, the above measures can be applied, replacing $h_{eq}$ by $h_{eq}^{MISO}$.

It is to be understood that the present invention is not limited to the embodiments described above, but encompasses any and all embodiments within the scope of the following claims.

We claim:

1. A geo-security method, comprising the steps of:
   (a) transmitting a probe signal using a transmitter of a wireless device at a transmission site to be authenticated;
   (b) time-reversal precoding a feedback transmission based on a channel response estimation of the probe signal;
   (c) including the time-reversal precoding in a signal transmission at the transmission site to be authenticated;
   (d) estimating the time-reversal precoding in the signal transmission;
   (e) authenticating the transmission site based on the estimating step (d) and the probe signal channel response estimation of step (b), wherein the step of authenticating the transmission site further comprises the step of measuring time delay focusing of energy at the antenna of the wireless device to measure the temporal compression due to the authenticating process, the time delay energy focusing being characterized by:

$$\Delta\tau(R_0) = \sqrt{\frac{\int (\tau - \tau_m)^2 |h_{eq}(t; \tau_0, T \to R_0)|^2 d\tau}{\int |h_{eq}(t; \tau_0, T \to R_0)|^2 d\tau}},$$

$$\tau_m(R_0) = \sqrt{\frac{\int \tau |h_{eq}(t; \tau_0, T \to R_0)|^2 d\tau}{\int |h_{eq}(t; \tau_0, T \to R_0)|^2 d\tau}},$$

$$\Delta\tau(R) = \sqrt{\frac{\int (\tau - \tau_m)^2 |h_{eq}(t; \tau, T \to R)|^2 d\tau}{\int |h_{eq}(t; \tau, T \to R)|^2 d\tau}},$$

and $$\tau_m(R) = \sqrt{\frac{\int \tau |h_{eq}(t; \tau, T \to R)|^2 d\tau}{\int |h_{eq}(t; \tau, T \to R)|^2 d\tau}},$$

the time delay compression metric being defined as the relative increase in RMS delay spread $\Delta\tau(R)$ at any point R compared to that at $R_0$, the parameter being denoted as:

$$\sigma(R) = \frac{\Delta\tau(R) - \Delta\tau(R_0)}{\Delta\tau(R_0)},$$

where $\tau_0$ is such that $$|h_{eq}(t; \tau_0, T \to R)| = \max_\tau (|h_{eq}(t; \tau, T \to R_0)|)$$

is the delay of the peak of the equivalent channel impulse response at the antenna when the authentication device is at its intended position;
   (f) repeating the steps for the wireless device, wherein the wireless device has a unique time reversal (TR) spatial-temporal authentication key; and
   (g) using a reconfigurable antenna in which a particular radiation pattern is generated to increase security and enhance system performance, wherein the generated particular antenna radiation pattern further comprises the step of identifying each radiation pattern state using a unique combination code of ON-OFF switches in control circuitry of the antenna.

2. The geo-security method according to claim 1, further comprising the step of using multiple said unique TR authentication keys for every antenna to authenticate the multiple said wireless devices, the authentication being based on multiple transmit antennas corresponding to the multiple said wireless devices.

3. The geo-security method according to claim 1, wherein the transmission site to be authenticated has multiple transmit antennas, the method further comprising the step of performing steps (a) through (e) independently for each of the multiple transmit antennas so that the authentication is based on multiple transmit antennas, whereby the authentication of the transmission site is improved.

4. The geo-security method according to claim 1, wherein said step of authenticating the transmission site further comprises the step of measuring spatial focusing of energy at the antenna of the authenticated device at a specific instant of time.

5. The geo-security method according to claim 1, wherein said step of authenticating the transmission site further comprises the step of measuring peak energy of a received signal independently from a time delay.

6. The geo-security method according to claim 1, further comprising the step of detecting an energy level that is higher than a pre-set threshold at a receiver of the authenticated device, authentication being based on measuring a 3-dB contour around the pre-set threshold to allow local movement of the authenticated device.

7. A geo-security system, comprising:
   (a) means for transmitting a probe signal using a transmitter of a wireless device at a transmission site to be authenticated;
   (b) means for time-reversal precoding a feedback transmission based on a channel response estimation of the probe signal;
   (c) means for including the time-reversal precoding in a signal transmission at the transmission site to be authenticated;
   (d) means for estimating the time-reversal precoding in the signal transmission;
   (e) means for authenticating the transmission site based on the time-reversal precoding estimating means (d) and the probe signal channel response estimation;
   (f) wherein the means (b), the means (d), and the means (e) each comprise means for authenticating multiple said wireless devices, each said wireless device having a corresponding said means (a), a corresponding means (c), and a unique time reversal (TR) spatial-temporal authentication key;
   (g) means for using a reconfigurable antenna in which a particular radiation pattern is generating to increase security and enhance system performance;
   (h) means for identifying each radiation pattern state using a unique combination code of ON-OFF switches in control circuitry of the antenna; and
   (i) means for measuring temporal energy focusing with peak-to-side lobe ratio characterized by:

$$\eta = 20\log_{10}\left(\frac{|h_{eq}(t; \tau_0, T \to R)|}{\max_\tau |h_{eq}(t; \tau, T \to R)|}\right),$$

where R is the energy and T is the position at which the antenna is located.

8. The geo-security system according to claim 7, wherein each said wireless device has a corresponding antenna, the system further comprising means for using said unique TR authentication keys for each said antenna to authenticate said wireless devices.

9. The geo-security system according to claim 7, further comprising means for measuring spatial focusing of energy at the antenna of the authenticated device at a specific instant of time.

10. The geo-security system according to claim 7, further comprising means for measuring peak energy of the received signal independently from a time delay.

11. The geo-security system according to claim 7, further comprising means for detecting an energy level higher than a pre-set threshold at the receiver of the authenticated device, the system having means for measuring a 3-dB contour around the pre-set threshold to allow local movement of the authenticated device.

12. A geo-security method, comprising the steps of:
(a) transmitting a probe signal using a transmitter of a wireless device at a transmission site to be authenticated;
(b) time-reversal precoding a feedback transmission based on a channel response estimation of the probe signal;
(c) including the time-reversal precoding in a signal transmission at the transmission site to be authenticated;
(d) estimating the time-reversal precoding in the signal transmission;
(e) authenticating the transmission site based on the estimating step (d) and the probe signal channel response estimation of step (b), wherein the step of authenticating the transmission site further comprises the step of measuring temporal energy focusing with peak-to-side lobe ratio characterized by:

$$\eta = 20\log_{10}\left(\frac{|h_{eq}(t; \tau_0, T \to R)|}{\max_{\tau}|h_{eq}(t; \tau, T \to R)|}\right),$$

where R is the energy and T is the position at which the antenna is located;

(f) repeating the steps for the wireless device, wherein the wireless device has a unique time reversal (TR) spatial-temporal authentication key; and
(g) using a reconfigurable antenna in which a particular radiation pattern is generated to increase security and enhance system performance, wherein the generated particular antenna radiation pattern further comprises the step of identifying each radiation pattern state using a unique combination code of ON-OFF switches in control circuitry of the antenna.

* * * * *